United States Patent
Choi et al.

(10) Patent No.: US 12,450,006 B2
(45) Date of Patent: Oct. 21, 2025

(54) DATA STORAGE DEVICE, SYSTEM AND CONTROLLER

(71) Applicant: SK hynix Inc., Icheon-si (KR)

(72) Inventors: Jung Min Choi, Icheon-si (KR); Hyun Chul Kim, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 18/532,980

(22) Filed: Dec. 7, 2023

(65) Prior Publication Data

US 2025/0021264 A1    Jan. 16, 2025

(30) Foreign Application Priority Data

Jul. 11, 2023  (KR) .......................... 10-2023-0089489

(51) Int. Cl.
    *G06F 3/06*    (2006.01)
(52) U.S. Cl.
    CPC .......... *G06F 3/0658* (2013.01); *G06F 3/0619* (2013.01); *G06F 3/0671* (2013.01)
(58) Field of Classification Search
    CPC ..... G06F 3/0658; G06F 3/0619; G06F 3/0671
    See application file for complete search history.

(56) References Cited

U.S. PATENT DOCUMENTS

| | | | | |
|---|---|---|---|---|
| 10,521,303 | B2* | 12/2019 | Kim ..................... | G06F 11/1096 |
| 11,366,710 | B1* | 6/2022 | Hung .................. | G06F 11/0751 |
| 11,740,801 | B1* | 8/2023 | Kuzmin ............... | G06F 3/0616 |
| | | | | 711/103 |
| 2006/0010352 | A1* | 1/2006 | Mukherjee .......... | G06F 11/0775 |
| | | | | 714/E11.026 |
| 2008/0301525 | A1* | 12/2008 | Hirose ................ | G06F 11/1068 |
| | | | | 714/763 |
| 2011/0087950 | A1* | 4/2011 | Yu ....................... | G06F 11/1072 |
| | | | | 711/E12.001 |
| 2016/0259675 | A1* | 9/2016 | Ninose ................ | G06F 11/0751 |
| 2019/0371409 | A1* | 12/2019 | Brandt ................. | G11C 16/16 |
| 2020/0285519 | A1* | 9/2020 | Jeon ..................... | G06F 9/5022 |
| 2022/0075546 | A1* | 3/2022 | Potyraj ................. | G06F 9/5072 |

FOREIGN PATENT DOCUMENTS

| | | |
|---|---|---|
| KR | 20190086176 A | 7/2019 |
| KR | 20210006664 A | 1/2021 |

\* cited by examiner

*Primary Examiner* — Khoa D Doan
(74) *Attorney, Agent, or Firm* — Perkins Coie LLP

(57) ABSTRACT

In an embodiment of the disclosed technology, a defective memory region is detected on the basis of operation information of a memory region included in a memory system and allocated to a host device, a warning signal is transmitted to a host device to which the defective memory region is allocated, and the defective memory region is excluded from a pool of allocatable memory regions to reduce or prevent data loss of a host device using memory regions of the memory system that may occur due to the defective memory region.

20 Claims, 11 Drawing Sheets

DATA STORAGE DEVICE, SYSTEM AND CONTROLLER

CROSS-REFERENCE TO RELATED APPLICATION

This patent document claims the priority and benefits of Korean Patent Application No. 10-2023-0089489 filed on Jul. 11, 2023, which is incorporated herein by reference in its entirety.

TECHNICAL FIELD

Various embodiments of the disclosed technology generally relate to a data storage system such as a memory system, and a controller such as a memory controller.

BACKGROUND

A memory system (or data storage system) may include one or more memory devices, each of which includes a plurality of memory cells configured to store data. In some implementations, the memory system may also include a memory controller configured to control the operations of the one or more memory devices.

The memory system may allocate or deallocate one or more memory regions included in the one or more memory devices according to a request of a host device. The memory system may perform memory operations such as writing, reading, or erasing operations on one or more memory regions allocated to the host device according to a request of the host device.

Error handling is an important part of the overall reliability of the memory system because errors that occur in a memory region allocated to the host device can result in a loss of data of the host device.

SUMMARY

Various embodiments of the disclosed technology are directed to providing measures capable of predicting an occurrence of an error in a memory region included in a memory and preventing loss or the like of data stored in the memory region.

In an embodiment, a memory system may include: a plurality of memory devices, each memory device including a plurality of memory regions configured to store data; at least one memory controller in communication with the plurality of memory devices and a plurality of host devices and configured to control an operation of each of the plurality of memory devices in response to requests for memory operations from the plurality of host devices; and a memory management module configured be in communication with at least one of the plurality of memory devices, the plurality of host devices, or the at least one memory controller, and configured to allocate, in response to an allocation request from one or more host devices of the plurality of host devices, one or more memory regions of the plurality of memory regions of one or more memory devices of the plurality of memory devices to the one or more host devices; and transmit, upon identifying a memory region allocated to a first host device of the one or more host devices as a defective memory region with the memory device where an error is predicted to occur, a warning signal to the first host device.

In an embodiment, a data storage system may include: a plurality of storage devices including a plurality of memory devices each memory device including a plurality of memory regions configured to store data; and a memory management device located outside the plurality of storage devices, and configured to: allocate one or more memory regions of the plurality of memory regions in response to an allocation request from one or more host devices of a plurality of host devices; and transmit, upon identifying a defective memory region where an error is predicted to occur, a warning signal to a first host device of the plurality of host devices that is allocated with the defective memory region.

In an embodiment, a control unit may include at least one memory controller configured to control an operation of a plurality of memory devices, each memory device including a plurality of memory regions configured to store data; and a memory management module configured to: allocate, in response to an allocation request from one or more host devices of a plurality of host devices, one or more memory regions of the plurality of memory regions to the one or more host devices; and transmit, upon identifying a memory region allocated to a first host device of the one or more host devices as a defective memory region where an error is predicted to occur, a warning signal to a host device of the plurality of host devices that is allocated with the defective memory region.

In an embodiment, a memory system may include: a plurality of memory devices each including a plurality of memory regions; at least one memory controller configured to control an operation of each of the plurality of memory devices; and a memory management module configured to allocate, in response to an allocation request of each of a plurality of host devices, some memory regions among the plurality of memory regions corresponding to a host device among the plurality of host devices which has transmitted the allocation request, and transmit, when a defective memory region where an error is predicted to occur is identified among the plurality of memory regions, a warning signal to a first host device which is allocated with the defective memory region among the plurality of host devices.

In an embodiment, a memory system may include: a plurality of memory devices each including a plurality of memory regions; at least one memory controller configured to control an operation of each of the plurality of memory devices; and a memory management module configured to allocate the memory regions in response to an allocation request of each of a plurality of host devices, identify a defective memory region on the basis of error occurrence prediction information received from at least one of the plurality of host devices, and allocate, upon allocation requests of the plurality of host devices, memory regions other than the defective memory region as memory regions corresponding to host devices which have transmitted the allocation requests.

In an embodiment, a data storage system may include: a plurality of storage devices including memory devices each including a plurality of memory regions; and a memory management device located outside the plurality of storage devices, and configured to allocate the memory regions according to an allocation request of each of a plurality of host devices and transmit, when a defective memory region where an error is predicted to occur is identified among the memory regions, a warning signal to a first host device among the plurality of host devices which is allocated with the defective memory region.

In an embodiment, a data storage device may include: a plurality of memory devices each including a plurality of memory regions; and a memory controller configured to control an operation of each of the plurality of memory devices, and migrate data stored in a defective memory region among the plurality of memory regions where an error is predicted to occur, to a new memory region according to a command received from the outside.

In an embodiment, a control unit may include: at least one memory controller configured to control an operation of each of the plurality of memory devices each including a plurality of memory regions; and a memory management module configured to allocate the memory regions according to an allocation request of each of a plurality of host devices, and transmit, when a defective memory region where an error is predicted to occur is identified among the memory regions, a warning signal to a host device among the plurality of host devices which is allocated with the defective memory region.

According to the embodiments of the disclosed technology, since occurrence of an error in a memory region included in a memory is predicted and allocation information of the memory region where an error is predicted to occur and data and so forth stored in the corresponding memory region are managed in advance, it is possible to prevent or reduce defects due to occurrence of an error in the memory region.

DETAILED DESCRIPTION

In the following description of examples or embodiments of the present disclosure, reference will be made to the accompanying drawings in which it is shown by way of illustration specific examples or embodiments that can be implemented.

Figure 1:
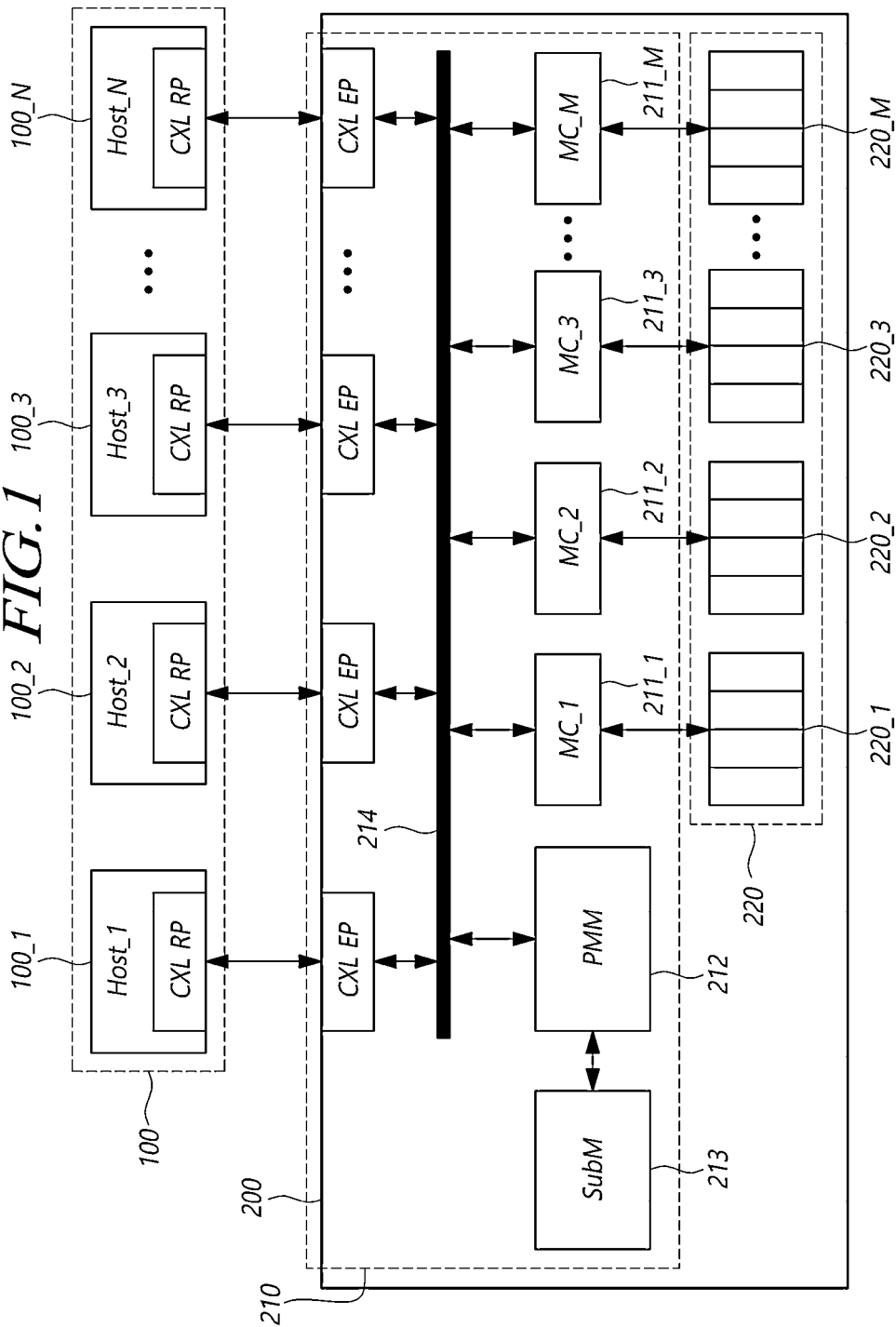
FIG. 1 is a diagram illustrating an example of the configuration of a memory system based on an embodiment of the disclosed technology.

FIG. 1 is a diagram illustrating an example of the configuration of a memory system 200 based on an embodiment of the disclosed technology.

Referring to FIG. 1, the memory system 200 based on the embodiment of the disclosed technology may include, for example, a control unit 210 and a plurality of memory devices 220.

Each of the plurality of memory devices 220 may be, for example, a volatile memory such as a DRAM, an SDRAM, a DDR SDRAM, an LPDDR SDRAM and a GRAM, but the disclosed technology is not limited thereto. In some implementations, each of the plurality of memory devices 220 may be a nonvolatile memory. In addition, the disclosed technology may be implemented in some embodiments to include only one memory device 220 in the memory system 200.

The memory system 200 may allocate or deallocate memory regions included in the plurality of memory devices 220 according to a request of a host device 100 located at the outside. The memory system 200 may perform an operation of writing or erasing data to or in a memory region allocated to the host device 100 or reading data of a memory region allocated to the host device 100, according to a request of the host device 100.

For example, the memory system 200 may allocate memory regions included in the plurality of memory devices 220 while communicating with one host device 100. Alternatively, the memory system 200 may allocate memory regions included in the plurality of memory devices 220 while communicating with at least two host devices 100. The example shown in FIG. 1 illustrates a case where the memory system 200 allocates memory regions included in the plurality of memory devices 220 while communicating with n host devices 100_1, 100_2, 100_3, . . . , 100_N (N is a positive integer).

For example, the host device 100 may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a telematics network, an RFID (radio frequency identification) device, a mobility device (e.g., a vehicle, a robot or a drone) capable of driving under human control or autonomous driving, etc. Alternatively, the host device 100 may be a virtual/augmented reality device which provides a 2D or 3D virtual reality image or augmented reality image. The host device 100 is not limited to the above examples, and may be any one of various electronic devices which require the memory system 200 capable of storing data.

The host device 100 may include at least one operating system. The operating system may manage and control overall functions and operations of the host device 100. The operating system may control an interoperation between the host device 100 and the memory system 200. The operating system may be classified into a general operating system and a mobile operating system depending on the mobility of the host device 100.

The host device 100 and the memory system 200 may be collectively referred to as a computing system.

The host device 100 may perform communication with the memory system 200 through a preset interface.

For example, the host device 100 may communicate with the memory system 200 through a Compute Express Link (CXL) interface. Compute Express Link (CXL) is an open standard interconnect that maintains a unified memory space and high-speed communication between a host processor and attached devices and systems such as memory devices and systems. Since the host device 100 communicates with the memory system 200 through the CXL interface, a low-latency high-bandwidth access environment may be implemented in a structure which communicates with the memory system 200 including the plurality of high-capacity memory devices 220.

Alternatively, In some implementations, the host device 100 may communicate with the memory system 200 through an interface other than the CXL interface.

For example, the host device 100 and the memory system 200 may communicate through at least one among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol and an IDE (integrated drive electronics) protocol, but are not limited thereto.

As described above, the type and number of the host devices 100 which perform communication with the memory system 200 based on the embodiment of the disclosed technology and a communication interface between the host devices 100 and the memory system 200 may be various, but hereinafter, a case where two or more host devices 100 communicate with the memory system 200 through the CXL interface will be described as an example.

The control unit 210 included in the memory system 200 may perform operations required according to requests or commands received from the plurality of host devices 100.

The control unit 210 may include, for example, at least one memory controller 211 and a memory management module 212. The control unit 210 may include an auxiliary memory 213, and communication in the control unit 210 may be performed through a bus 214.

The at least one memory controller 211 may control operations of the plurality of memory devices 220.

For example, the memory controller 211 may perform an operation of writing or erasing data to or in memory regions of the plurality of memory devices 220 or reading data of memory regions of the plurality of memory devices 220, according to a command inputted from the outside.

The memory controller 211 may provide channels through which commands and data inputted from the outside and data stored in the memory devices 220 are transmitted and received. One memory controller 211 may control two or more memory devices 220, or memory controllers 211 corresponding to two or more memory devices 220, respectively, may control corresponding memory devices 220.

The example shown in FIG. 1 illustrates a case where the memory system 200 includes two or more M memory devices 220_1, 220_2, 220_3, ..., 220_M and M memory controllers 211_1, 211_2, 211_3, ..., 211_m corresponding to the M memory devices 220_1, 220_2, 220_3, ..., 220_M, respectively, are included in the control unit 210 (M is a positive integer). Since the M memory controllers 211_1, 211_2, 211_3, ..., 211_M corresponding to the M memory devices 220_1, 220_2, 220_3, ..., 220_M, respectively, control respective operations of the M memory devices 220_1, 220_2, 220_3, ..., 220_M, the data processing speed of the memory system 200 may be improved. In some implementations, the M memory devices 220_1, 220_2, 220_3, ..., 220_M may be included in a memory pool. The disclosed technology can be implemented in some embodiments to use a memory pooling technique that allows for multiple compute nodes, such as processors and memory controllers, to access multiple memory devices in an on-demand fashion providing flexible and efficient access to greater memory bandwidth and capacity.

For example, the memory controller 211 may perform a read operation to read data from the memory device 220 and may detect and correct an error in the read data using, e.g., error correction techniques.

In some implementations, the memory controller 211 may include an error detection and correction circuit. When reading data stored in the memory device 220, a read operation may be performed using a preset read voltage. When the read operation fails, an error correction operation may be performed by the error detection and correction circuit.

For example, the error detection and correction circuit may detect an error bit in target data and correct the detected error bit by using an error correction code. The target data may be data that is read from the memory device 220 or data that is stored in a working memory different from the memory device 220.

The error detection and correction circuit may detect an error bit on a sector basis for each read data. The sector may be mapped to each read data set based on an address.

The error detection and correction circuit may calculate a bit error rate, and may determine whether an error is correctable or not on a sector basis. For example, when a bit error rate is lower than a reference value, the error detection and correction circuit may determine that a corresponding sector is correctable and may label the corresponding sector with "pass." When read data is recovered by performing the error correction operation using the error detection and correction circuit, recovered data may be transmitted to the outside.

When a bit error rate is higher than the reference value, the error detection and correction circuit may determine that a corresponding sector is uncorrectable and may label the corresponding sector with "fail."

In some implementations, the error detection and correction circuit may detect one or more uncorrectable or "fail" sectors by performing an error detection and correction operation for all read data. The error detection and correction circuit may output information (e.g., address information) on the one or more uncorrectable sectors.

Information regarding error correction operations that are performed by the error detection and correction circuit may be maintained, managed and/or transmitted to the outside by the memory controller 211.

The memory management module 212 may control the operation of the memory controller 211.

The memory management module 212 may control allocation or deallocation of memory regions included in the memory device 220, according to a command received from the host device 100.

The memory management module 212 may transfer a command and data received from the host device 100, to the memory controller 211 which controls a corresponding memory device 220. In some implementations, the memory management module 212 may be a switching module configured to transfer a command received from the host device 100 to the memory controller 211 or the memory device 220, or may be part of a switching module.

The control unit 210 may include the auxiliary memory 213. The memory management module 212 may store, in the auxiliary memory 213, information that can be used by the memory controller 211 or the memory device 220 for memory management purposes. The auxiliary memory 213 may be, for example, an SRAM, but the disclosed technology is not limited thereto.

The memory management module 212 may allocate or deallocate a memory region according to a request of the host device 100. Also, the memory management module 212 may detect a memory region where an error is predicted to occur, by using information on the error detection and correction operation performed by the memory controller 211.

In various implementations, at least one of the memory management module 212 or the memory controller 211 can be connected to be in communication with the one or more host devices including receiving host requests.

Figure 2:
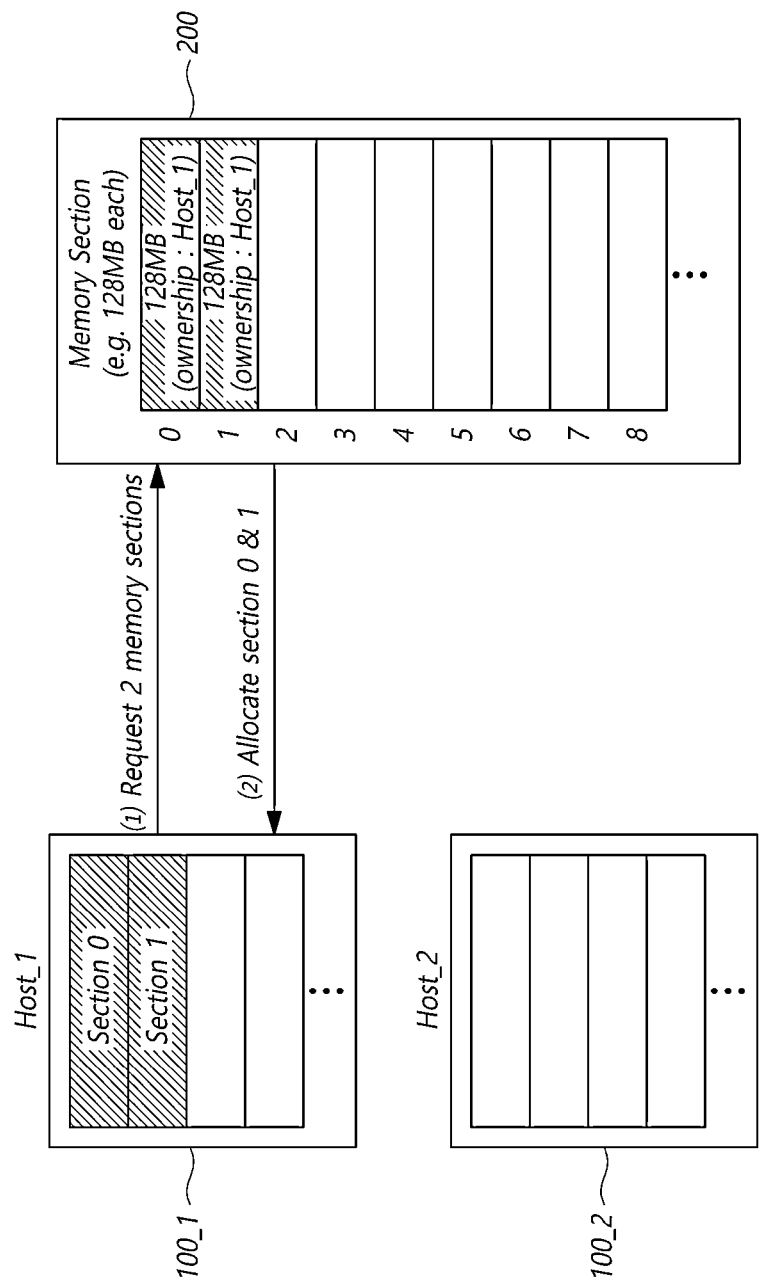
FIGS. 2 to 4 illustrate examples of how a memory system based on an embodiment of the disclosed technology allocates and deallocates memory regions according to requests of a host device.
Figure 3:
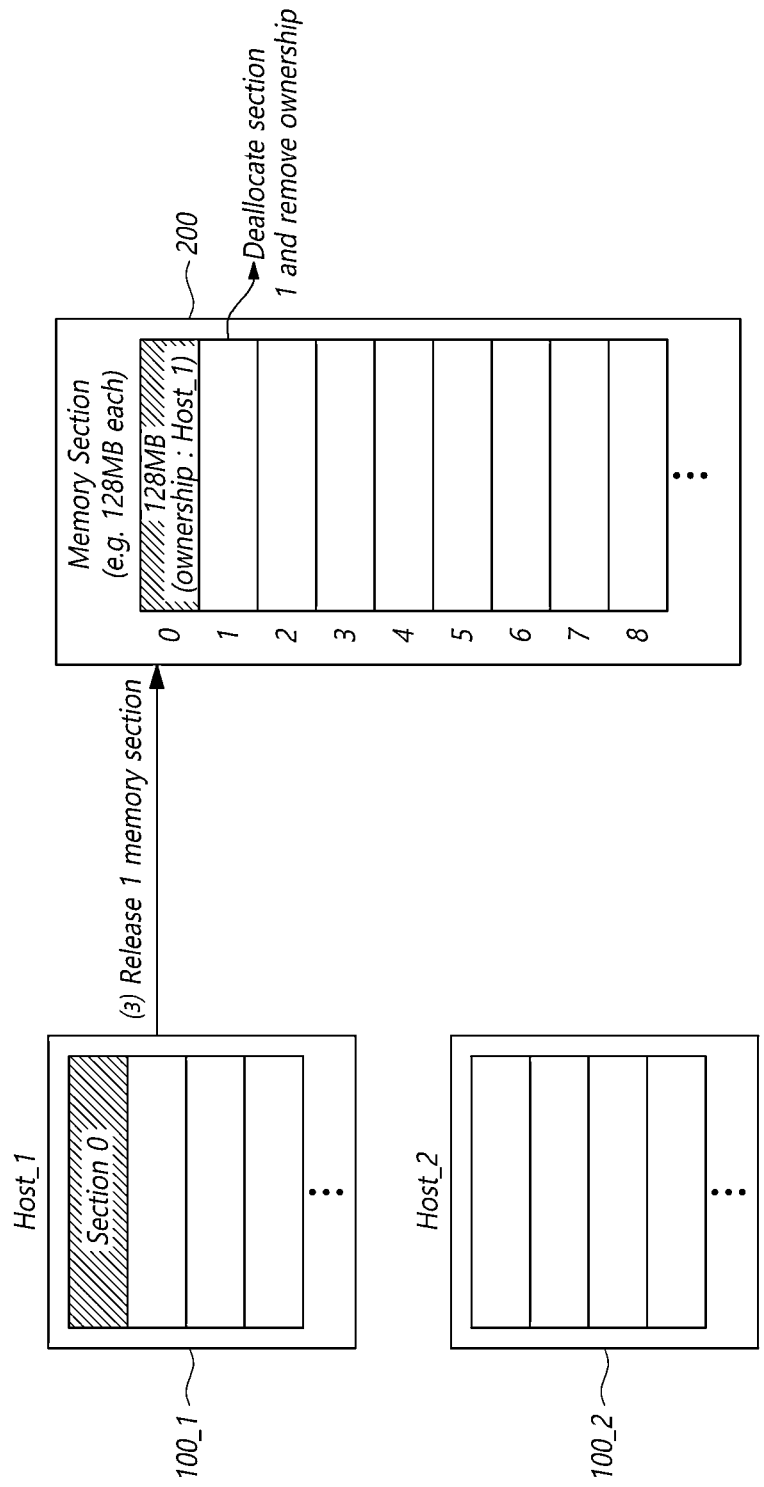
Figure 4:
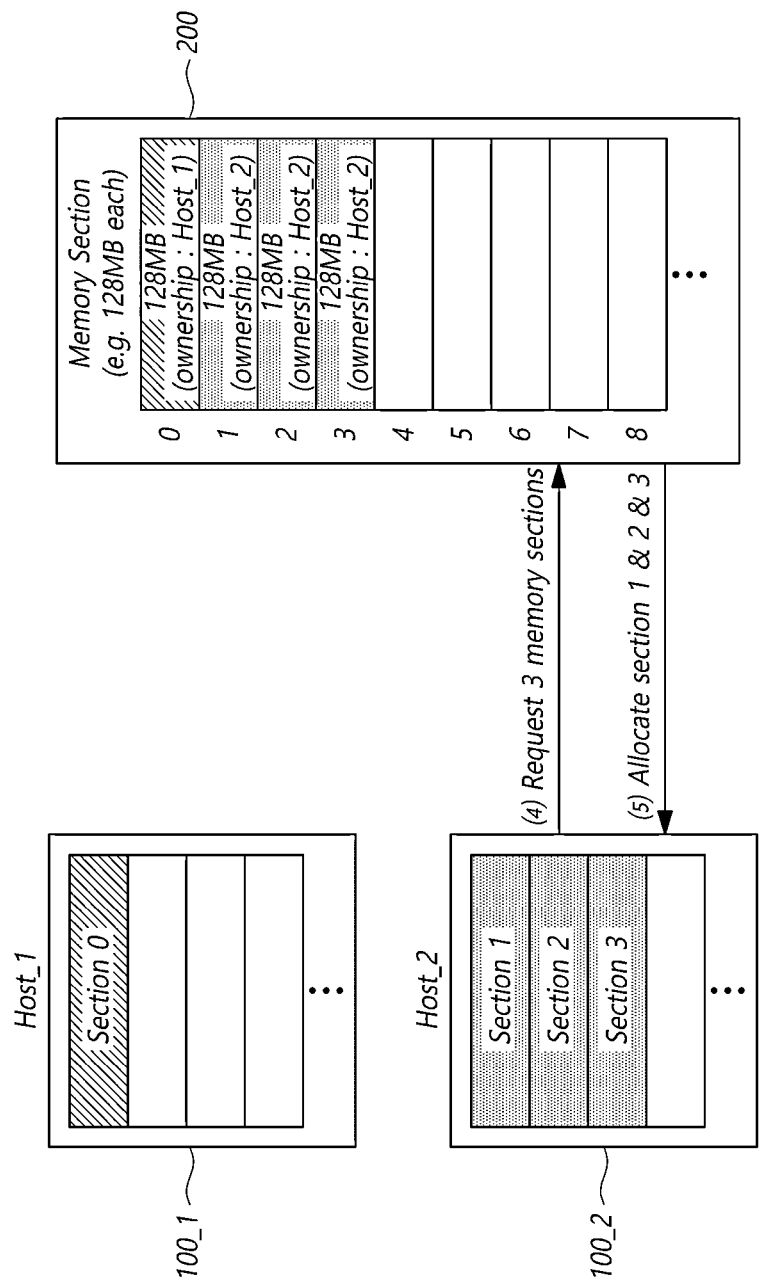

FIGS. 2 to 4 illustrate examples of how the memory system 200 based on an embodiment of the disclosed technology allocates and deallocates memory regions according to requests of the host device 100.

Referring to FIGS. 2 to 4, in some implementations, the memory system 200 allocates or deallocates memory regions included in the memory devices 220, according to requests received from the first host device 100_1 and the second host device 100_2 of the plurality of host devices 100.

The term "memory section" used in FIGS. 2 to 4 may indicate a memory region, and may include two or more memory cells or two or more memory blocks. Although FIGS. 2 to 4 illustrate an example where the size of the memory section is 128 MB, the disclosed technology is not limited thereto.

For example, the memory system 200 may allocate or deallocate memory regions of the plurality of memory devices 220 included in the memory system 200 by handling the memory regions as if they are included in one memory device 220.

Referring to FIG. 2, at operation (1), the memory system 200 may receive an allocation request for two memory regions from the first host device 100_1. At operation (2), the memory system 200, e.g., the memory management module 212 included in the memory system 200 may allocate a memory region 0 and a memory region 1 among the memory regions included in the plurality of memory devices 220, to the first host device 100_1. In one example, the memory region 0 and the memory region 1 may be from the same memory device. In another example, the memory region 0 and the memory region 1 may be from different memory devices.

The memory management module 212 may store, in the auxiliary memory 213, occupation information that the memory region 0 and the memory region 1 are allocated to the first host device 100_1. For example, as the occupation information on the memory region 0 and the memory region 1, the identification number of the first host device 100_1 may be stored.

When the memory region 0 and the memory region 1 are allocated to the first host device 100_1, the first host device 100_1 may transmit, to the memory system 200, a command for writing data to or erasing data from the memory region 0 and the memory region 1 or reading data from the memory region 0 and the memory region 1.

The memory management module 212 may transfer the corresponding command or data to the memory controller 211 which controls operations of the memory device 220 including the memory region 0 and the memory region 1.

In some implementations, the memory system 200 may deallocate a memory region allocated to the first host device 100_1 in response to a deallocation request received from the first host device 100_1.

Referring to FIG. 3, at operation (3), the memory system 200 may receive a deallocation request for one memory region from the first host device 100_1.

The memory management module 212 may perform deallocation of the memory region 1 according to the deallocation request received from the first host device 100_1. The memory management module 212 may update occupation information to label the memory region 1 with an unallocated memory region.

The memory system 200 may perform an operation according to a request or command received from the second host device 100_2 different from the first host device 100_1.

Referring to FIG. 4, at operation (4), the memory system 200 may receive an allocation request for three memory regions from the second host device 100_2.

When receiving the allocation request from the second host device 100_2, the memory management module 212 may allocate memory regions based on occupation information on the memory regions included in the memory devices 220.

Referring to FIG. 4, at operation (5), according to the allocation request of the second host device 100_2, the memory management module 212 may allocate the memory region 1, a memory region 2 and a memory region 3 to the second host device 100_2. The memory management module 212 may update occupation information on the memory region 1, the memory region 2 and the memory region 3 to indicate that the memory region 1, the memory region 2 and the memory region 3 are allocated to the second host device 100_2.

In some implementations, data is written to, read from, or erased from the memory region 1, the memory region 2 and the memory region 3 in response to a command of the second host device 100_2.

A memory region included in the memory device 220 may be allocated by the memory management module 212, and the allocated memory region may be used by the host device 100.

The memory management module 212 may monitor operation information of the allocated memory region and predict an occurrence of an error in the memory region. In this way, it is possible to prevent data loss of the host device 100 that would have resulted from errors in the allocated memory region.

Figure 5:
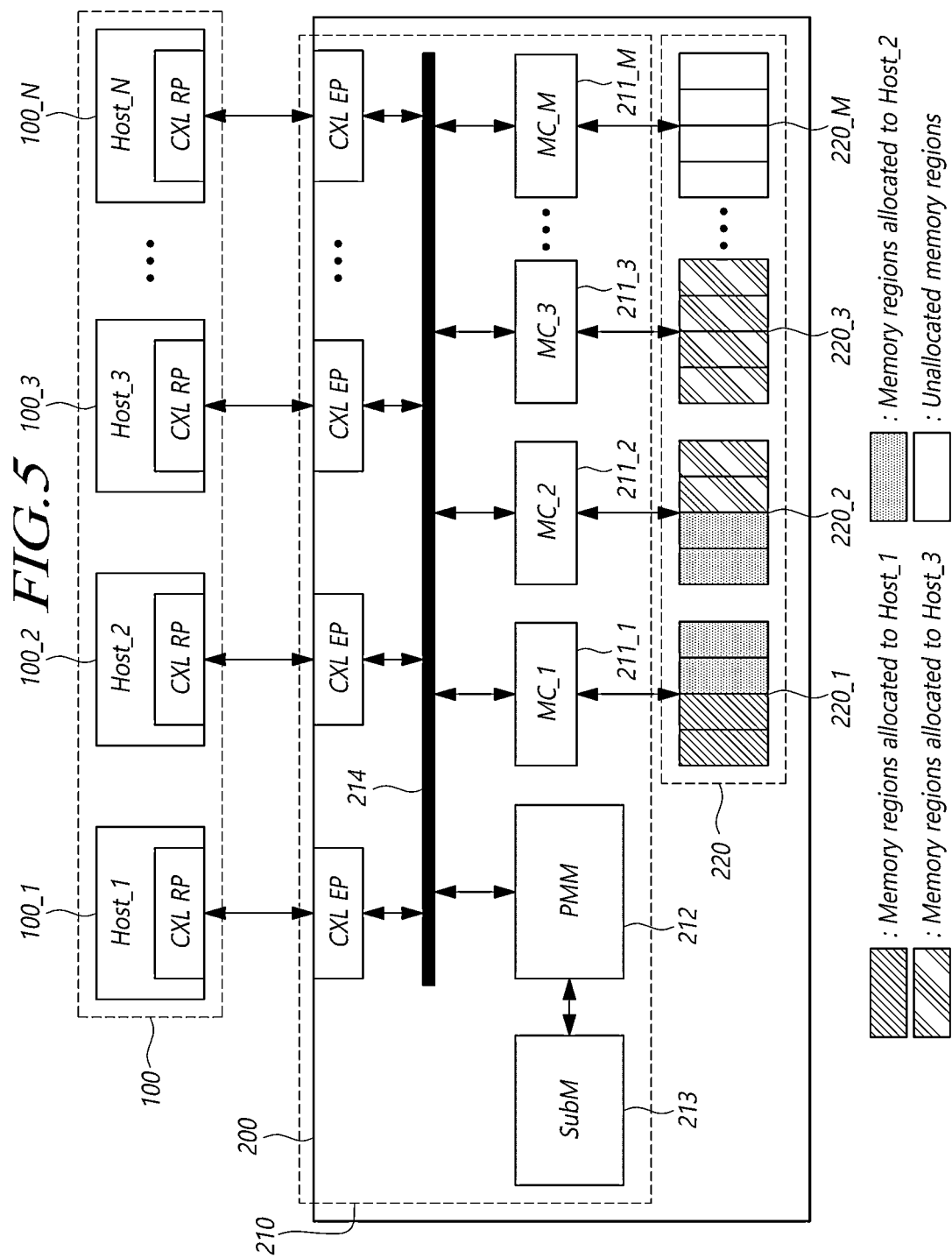
FIG. 5 is a diagram illustrating an example of an allocation of memory regions of the memory system to the host device based on an embodiment of the disclosed technology.
Figure 6:
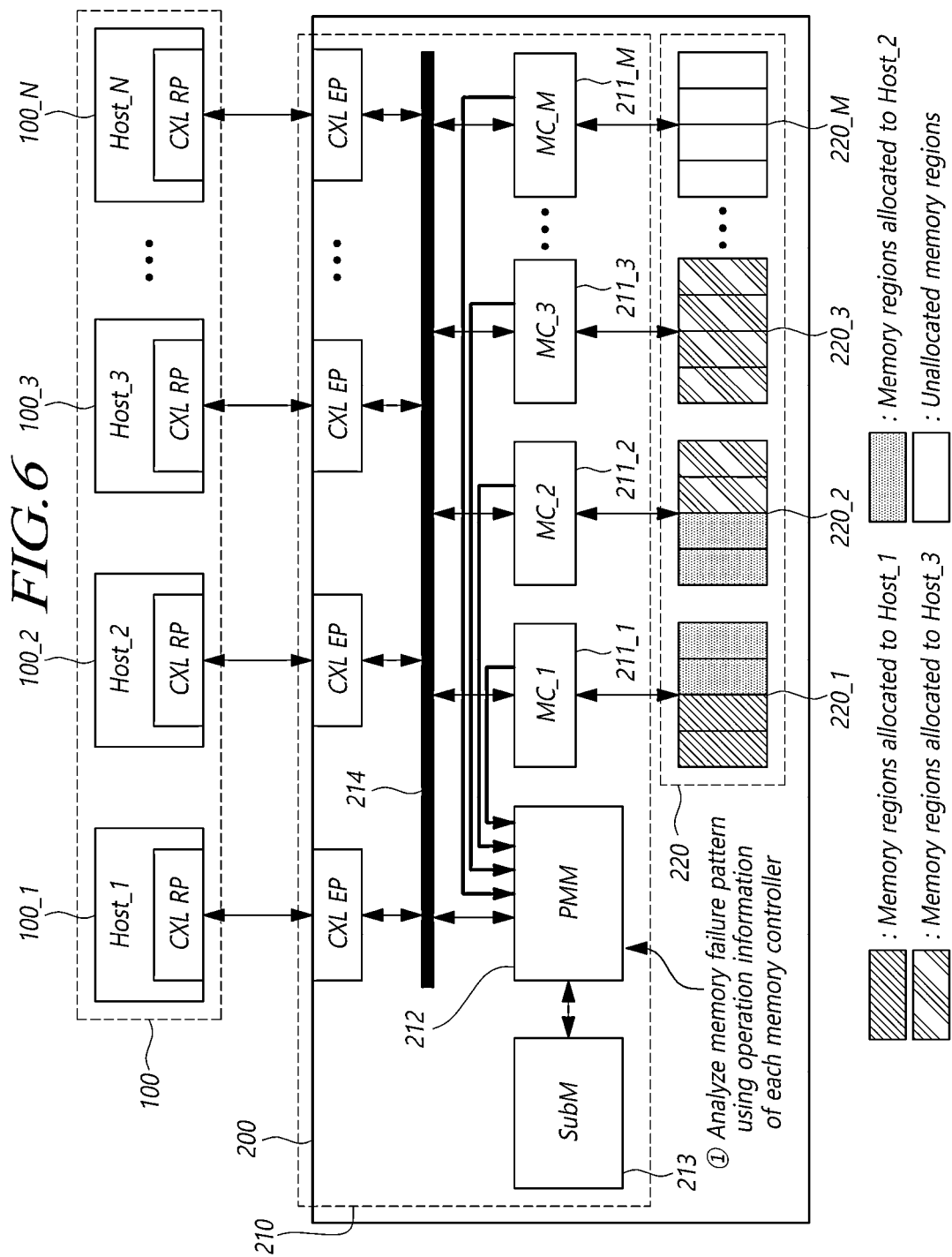
FIG. 6 is a diagram illustrating an example operation that is performed when the memory system based on an embodiment of the disclosed technology predicts an occurrence of an error in a memory region.

FIG. 5 is a diagram illustrating an example of an allocation of memory regions of the memory system 200 to the host device 100 based on the embodiment of the disclosed technology. FIG. 6 is a diagram illustrating an example operation that is performed when the memory system 200 based on the embodiment of the disclosed technology predicts an occurrence of an error in a memory region.

Referring to FIG. 5, as in the above-described example, the memory management module 212 of the memory system 200 may allocate memory regions included in the plurality of memory devices 220 according to allocation requests of the plurality of host devices 100.

For example, according to an allocation request of the first host device 100_1, a part of the memory regions included in the first memory device 220_1 among the plurality of memory devices 220 may be allocated to the first host device 100_1.

According to an allocation request of the second host device 100_2, a part of the memory regions included in the first memory device 220_1 and a part of the memory regions included in the second memory device 220_2 may be allocated to the second host device 100_2.

According to an allocation request of the third host device 100_3, a part of the memory regions included in the second memory device 220_2 and all of the memory regions included in the third memory device 220_3 may be allocated to the third host device 100_3.

The memory regions included in the plurality of memory devices 220 may be allocated sequentially or nonsequentially, and may be allocated in various ways according to allocation requests and deallocation requests received from the host devices 100.

In a state in which the memory regions are allocated to the first host device 100_1, the second host device 100_2 and the third host device 100_3, data may be written to or erased from the allocated memory regions according to commands of the respective host devices 100. In addition, data stored in the allocated memory regions may be read according to commands of the respective host devices 100.

The memory management module 212 may receive operation information from the memory controller 211, which controls the operation of each memory device 220, and may perform, the operation information, an analysis of the error occurrence prediction associated with memory regions included in the memory device 220. In some implementations, operation information may indicate information that is obtained according to the operation of the memory device 220 or information that is obtained according to the control operation of the memory controller 211 for the operation of the memory device 220. The operation information may include error detection information or error detection and correction information that indicates an error in the memory device 220 or information that can be used to detect an error in the memory device 220.

For example, referring to FIG. 6, the memory management module 212 may receive operation information from each of the plurality of memory controllers 211.

For example, the memory management module 212 may periodically receive operation information from each of the plurality of memory controllers 211.

Alternatively, when an interrupt signal is generated by each of the plurality of memory controllers 211, the memory management module 212 may receive operation information from the memory controller 211 which has generated the interrupt signal. Each of the plurality of memory controllers 211 may generate an interrupt signal when operation information regarding the error occurrence analysis is generated, and may transmit the corresponding operation information to the memory management module 212.

Alternatively, the memory management module 212 may transmit a signal requesting operation information to at least a part of the plurality of memory controllers 211, and may receive operation information from memory controllers 211 in response to the signal requesting operation information. The memory management module 212 may determine a time point when operation information is required, based on at least one of allocation information, frequency of use, or use period of each of the plurality of memory devices 220, and may request operation information at the corresponding time point.

The memory management module 212 may detect a memory region where an error is predicted to occur, among the memory regions included in the plurality of memory devices 220, based on operation information received from the plurality of memory controllers 211. A memory region where an error is predicted to occur may be referred to as a defective memory region.

The memory management module 212 may receive, from the memory controller 211, operation information on whether an error has been corrected and the number of error corrections when an operation of reading data stored in a memory region is performed, and may detect a defective memory region on the basis of the corresponding operation information.

For example, when reading data stored in a memory region, the memory controller 211 may transmit information on error correction performed by the above-described error detection and correction circuit, to the memory management module 212.

For example, the memory management module 212 may detect a defective memory region based on the number of error correction operations. The memory management module 212 may detect, as a defective memory region, a memory region in which the number of error correction operations is equal to or greater than a preset threshold value.

The memory management module 212 may detect, as a defective memory region, a part of memory regions adjacent to a defective memory region.

For example, the memory management module 212 may detect, as a defective memory region, a memory region that is adjacent to a defective memory region and has performed error correction operations the number of which is equal to or greater than a preset reference value. The preset reference value may be a value less than the preset threshold value. When a memory region adjacent to a defective memory region has the number of occurrences of error correction operations less than the preset threshold value but equal to or greater than the preset reference value, the corresponding memory region may be detected as a defective memory region.

The memory management module 212 may detect, as a defective memory region, a memory region in which an uncorrectable error occurs or a part of memory regions adjacent to the memory region.

In some implementations, the memory management module 212 may detect a memory region in which an error is predicted to occur, by using information obtained by the memory controller 211 according to the operation of a memory device 220 including a memory region allocated to the host device 100.

When detecting a defective memory region, the memory management module 212 may store and manage information on the defective memory region in the auxiliary memory 213.

Alternatively, in some implementations, the memory controller 211 may detect a defective memory region and transmit information on the detected defective memory region to the memory management module 212. In some implementations, the memory controller 211 detects a defective memory region in a similar way as the above-described scheme in which the memory management module 212 detects a defective memory region. The memory management module 212 may receive information on a defective memory region detected by the memory controller 211, from the memory controller 211. The memory management module 212 may perform a control operation based on the information on a defective memory region received from the memory controller 211.

Alternatively, in some implementations, the host device 100 may obtain information on error correction in the process of reading data from a memory device 220, and may detect a defective memory region in which an error is predicted to occur, based on the obtained information on error correction. Since the host device 100 may obtain information on error correction when reading data, the host device 100 may detect a defective memory region using the corresponding information. Since the host device 100 may detect a defective memory region during a read operation, the host device 100 may check whether a memory region allocated to the host device 100 is a defective memory region. Alternatively, In some implementations, a host device 100 may perform a read operation on a memory region allocated to another host device 100. In this case, during a read operation on the memory region allocated to the other host device 100, the host device 100 may check whether the corresponding memory region is a defective memory region.

When a defective memory region is detected by the analysis of the host device 100, the host device 100 may transmit information on the defective memory region to the memory system 200.

In some implementations, the memory system 200 may store, in the auxiliary memory 213, the information on the defective memory region received from the host device 100.

When a defective memory region is detected, the memory management module 212 may perform a separate control operation on the defective memory region to maintain or restore data stored in the defective memory region.

Figure 7:
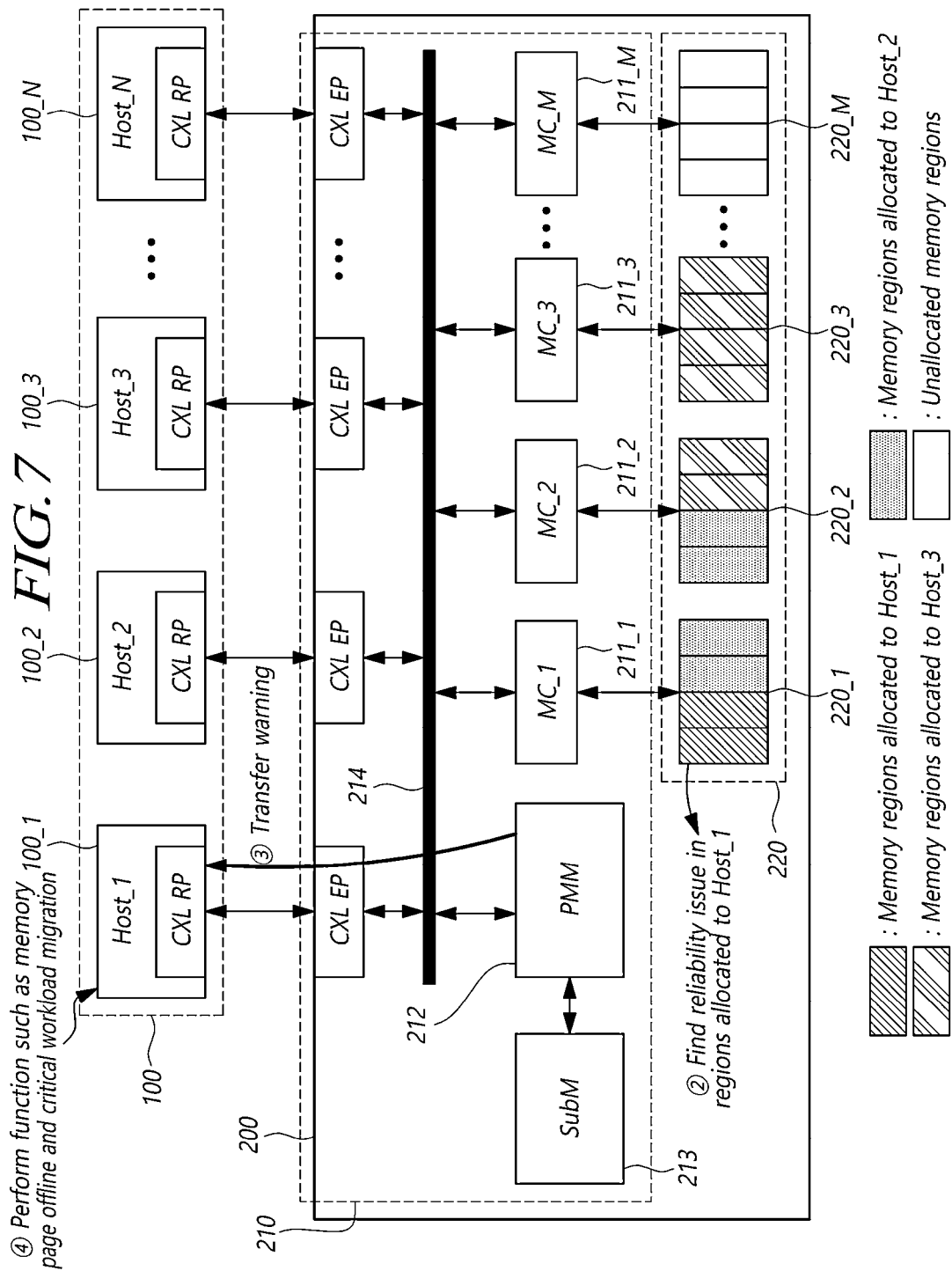
FIG. 7 is a diagram illustrating an example operation that is performed when the memory system based on an embodiment of the disclosed technology performs predicts an occurrence of an error in a memory region.

FIG. 7 is a diagram illustrating an example operation that is performed when the memory system 200 based on an embodiment of the disclosed technology performs predicts an occurrence of an error in a memory region.

Referring to FIG. 7, the memory management module 212 may detect a defective memory region based on operation information obtained from the memory controller 211 which controls the operation of the memory device 220. Alternatively, the memory management module 212 may receive information on a defective memory region from the memory controller 211 or the host device 100.

When the memory management module 212 detects a defective memory region, the memory management module 212 may detect a defective memory region where an error is predicted to occur, based on the number of error corrections performed when reading data stored in the corresponding memory region.

FIG. 7 shows as an example where a part of memory regions included in the first memory device 220_1 is detected as defective memory regions.

When a part of the memory regions included in the first memory device 220_1 is detected as defective memory regions, the memory management module 212 may identify a host device 100 allocated with the defective memory regions, based on occupation information stored in the auxiliary memory 213.

FIG. 7 shows as an example where memory regions allocated to the first host device 100_1 of the memory regions included in the first memory device 220_1 are detected as defective memory regions.

The memory management module 212 may transmit a warning signal regarding the detection of the defective memory regions to the first host device 100_1, which is allocated with the defective memory regions.

The disclosed technology can be implemented in some embodiments to transmit the warning signal regarding the detection of the defective memory regions to the first host device 100_1 allocated with the defective memory regions where errors are predicted to occur. In this way, the memory management module 212 may provide an opportunity for the first host device 100_1 to recognize states of the defective memory regions that are allocated from the memory system 200 and being used by the first host device 100_1, and may process data stored in the defective memory regions. In some implementations, the memory management module 212 may also transmit the warning signal to at least one host device 100 other than the first host device 100_1. Another host device 100 may recognize that the first memory device 220_1 of the memory devices 220 included in the memory system 200 includes the defective memory regions.

The memory management module 212 may transmit, to the first host device 100_1, the warning signal including information on whether a defective memory region exists and an address of a defective memory region. Alternatively, the memory management module 212 may include, in the warning signal, information regarding a defective memory region, such as a possibility of error occurrence, an erase/write (E/W) cycle and whether and how much a recovery of erroneous or corrupted data has progressed, or may transmit the information to the first host device 100_1 through a separate signal after transmitting the warning signal.

For example, the memory management module 212 may transmit the warning signal including at least one of the level and type of errors in a defective memory region, to the first host device 100_1. Alternatively, the memory management module 212 may transmit information on at least one of the level and type of errors in a defective memory region, to the first host device 100_1 through a signal separate from the warning signal.

The level of errors of data in a defective memory region may be classified depending on the severity of the errors. The severity of errors may be classified on the basis of, for example, the number of error corrections per page by the error detection and correction circuit. In one example, levels of errors depending on the severity of errors may be as follows.

| Severity | ECC coverage (threshold) | Notify to Host |
| --- | --- | --- |
| LV #1 (Information) | Page error count <50% | Informational Error Log Type |
| LV #2 (Warning) | 50%≤ Page error count <80% | Warning Error Log Type |
| LV #3 (Critical) | 80%≤ Page error count | Fatal Error Log Type |

For example, the memory management module 212 may classify errors in a defective memory region into three levels. In one example, the memory management module 212 may only transmit information on the level of errors to the first host device 100_1. In another example, the memory management module 212 may transmit information (e.g., ECC coverage) to the first host device 100_1 as a reference for the level of errors.

The first host device 100_1 may determine a management scheme for a defective memory region based on the level of errors received from the memory management module 212.

The type of errors in a defective memory region may be defined as, for example, a bit (cell) error, a row error, a bank/rank/device error, and a channel error. Since the severity may vary depending on the type of errors in a defective memory region, the severity may be classified depending on the type of errors. Information on the severity and type of errors may be classified as follows.

| Severity | Defected Error | Remark (Error Type) |
|---|---|---|
| LV #1 (Information) | Single page | Row |
| LV #2 (Warning) | Multiple pages | Row |
| LV #3 (Critical) | Multiple pages | Bank |

The memory management module 212 may transmit information on a type, such as whether detected errors occur in a single page or multiple pages and whether the type of errors is a row error or a bank error, to the first host device 100_1 by including the information in the warning signal or through a signal separate from the warning signal. Since the severity may vary depending on the type of errors, the first host device 100_1 may determine a processing scheme for a defective memory region based on the type and level of errors included in the warning signal.

Upon receiving the warning signal from the memory system 200, the first host device 100_1 may transmit a command for processing data stored in the defective memory regions to the memory system 200.

For example, when it is not necessary to use the data stored in the defective memory regions, the first host device 100_1 may instruct a memory page to be offline.

In some implementations, according to the command of the first host device 100_1, the memory management module 212 of the memory system 200 may stop operations of the defective memory regions allocated to the first host device 100_1.

The memory management module 212 may perform deallocation of the defective memory regions allocated to the first host device 100_1, or may perform erasure of the data stored in the defective memory regions.

In some implementations, the first host device 100_1 identifies the defective memory regions by the memory management module 212, and a data processing is performed on the defective memory regions. In this way, the first host device 100_1 can avoid data loss that would have resulted from errors in the defective memory regions.

When it is necessary to use the data stored in the defective memory regions, the first host device 100_1 may request the memory system 200 to migrate the corresponding data.

The first host device 100_1 may determine an operation to be performed on the defective memory regions, on the basis of information on the level or type of errors received through the warning signal. For example, the first host device 100_1 may classify an operation to be performed, according to the level of errors as follows.

| Severity | Behavior |
|---|---|
| LV #1 (Information) | Page offline |
| LV #2 (Warning) | Page offline/Post package repair |
| LV #3 (Critical) | Memory region isolation/Memory region replacement |

Since the first host device 100_1 may determine an operation to be performed on the defective memory regions, on the basis of the level or type of errors of the defective memory regions received from the memory management module 212, the first host device 100_1 may control an operation conforming to the state of the defective memory regions.

Figure 8:
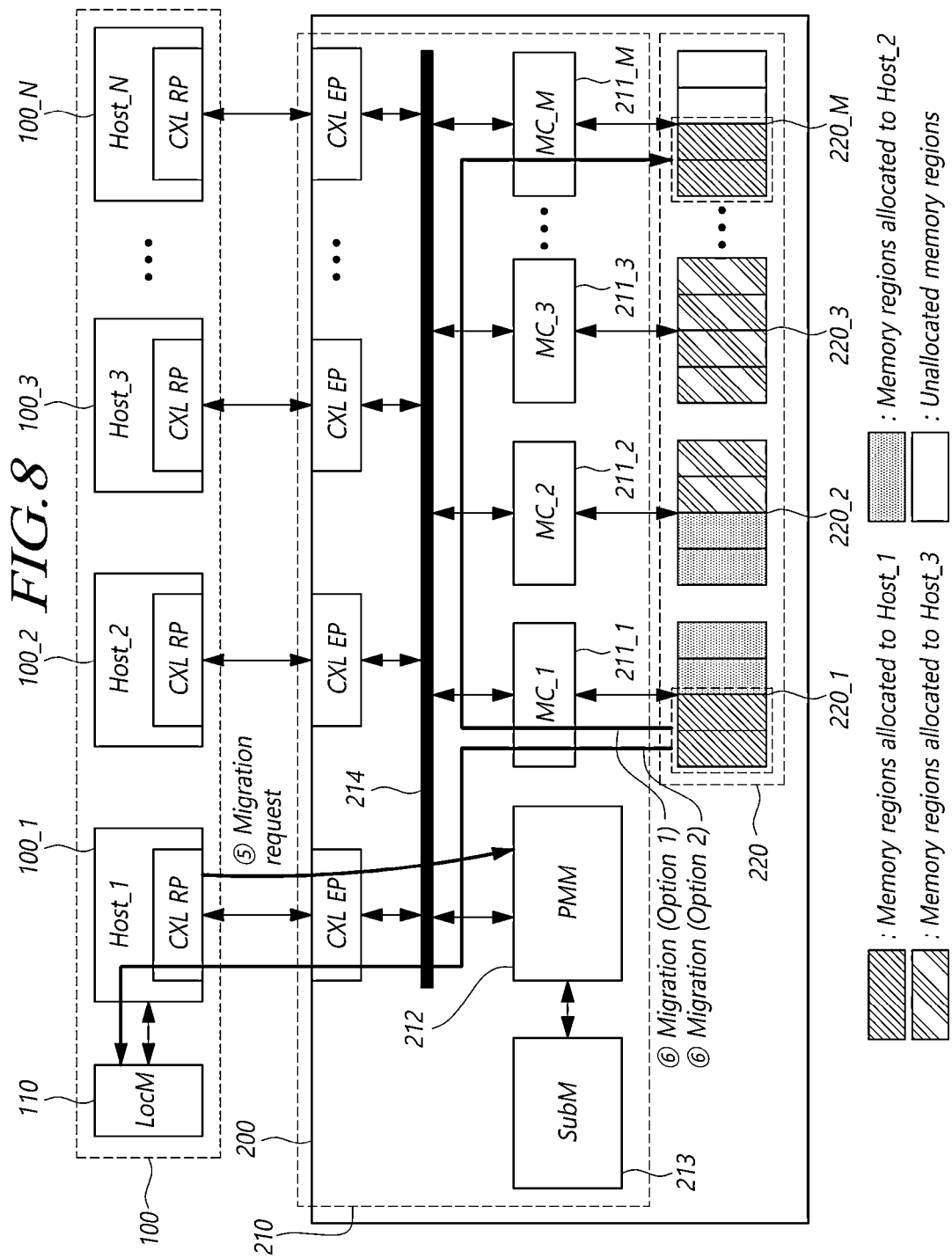
FIG. 8 is a diagram illustrating an example operation that is performed according to a command of the host device after the memory system based on the embodiment of the disclosed technology predicts an occurrence of an error in a memory region.

FIG. 8 is a diagram illustrating an example operation that is performed according to a command of the host device 100 after the memory system 200 based on the embodiment of the disclosed technology predicts an occurrence of an error in a memory region.

Referring to FIG. 8, the memory management module 212 may deallocate the defective memory regions according to the command received from the first host device 100_1, which has received the warning signal, and may stop operations of the defective memory regions.

Alternatively, the memory management module 212 may control an operation of migrating the data stored in the defective memory regions to other memory regions, according to the command received from the first host device 100_1.

For example, the first host device 100_1 may request the memory system 200 to migrate the data stored in the defective memory regions to other memory regions included in the memory system 200 (Option 1).

When receiving a request for data migration within the memory system 200 from the first host device 100_1, the memory management module 212 may allocate new memory regions included in the memory devices 220 to the first host device 100_1.

For example, as shown in FIG. 8, the memory management module 212 may allocate a part of memory regions included in the $M_{th}$ memory device 220_M to the first host device 100_1. According to the allocation of new memory regions, the memory management module 212 may update occupation information stored in the auxiliary memory 213.

When the new memory regions are allocated, the memory management module 212 may migrate data stored in some memory regions included in the first memory device 220_1, which are the defective memory regions, to some memory regions included in the $M_{th}$ memory device 220_M.

When migration of the data stored in the defective memory regions is completed, the memory management module 212 may stop operations of the defective memory regions or erase the data stored in the defective memory regions.

The memory management module 212 may provide information on the newly allocated memory regions to the first host device 100_1. The first host device 100_1 may use the newly allocated memory regions included in the $M_{th}$ memory device 220_M.

As another example, the first host device 100_1 may request the memory system 200 to migrate the data stored in the defective memory regions to a memory located outside the memory system 200 (Option 2).

The first host device 100_1 may request migration of the data stored in the defective memory regions to a local memory 110 that is adjacent to the first host device 100_1.

The local memory 110 may be, for example, a volatile memory such as an SRAM, a DRAM, an SDRAM, a DDR SDRAM, an LPDDR SDRAM and a GRAM, but the disclosed technology is not limited thereto.

The local memory 110 may be provided to each of the plurality of host devices 100. Each of the plurality of host devices 100 may store data using the local memory 110 and memory regions allocated from the memory system 200.

In some implementations, according to the migration request of the first host device 100_1, the memory management module 212 may transmit the data stored in the defective memory regions to the local memory 110, which is located adjacent to the first host device 100_1 and is controlled by the first host device 100_1.

When the migration operation of the data to the local memory 110 is completed, the memory management module 212 may stop operations of the defective memory regions or erase the data stored in the defective memory regions.

In some implementations, according to a request of the first host device 100_1, a part of the data stored in the defective memory regions may be migrated to a new memory region in the memory system 200, and the rest may be migrated to the local memory 110.

In some implementations, the memory management module 212 may perform processing on the defective memory regions without receiving a request of the first host device 100_1, which is allocated with the defective memory regions.

For example, upon transmitting the warning signal regarding the defective memory regions to the first host device 100_1, the memory management module 212 may migrate the data stored in the defective memory regions to new memory regions. The memory management module 212 may allocate the new memory regions to the first host device 100_1.

The memory management module 212 may transmit information on the allocation of the new memory regions to the first host device 100_1. For example, the memory management module 212 may modify mapping information on the defective memory regions into mapping information on the new memory regions, and may transmit the modified mapping information to the first host device 100_1.

Alternatively, the memory management module 212 may perform processing on the defective memory regions after receiving, from the first host device 100_1, an instruction on whether to use the data of the defective memory regions.

For example, when receiving an instruction not to use the data of the defective memory regions, such as a memory page offline, from the first host device 100_1, the memory management module 212 may deallocate the defective memory regions. The memory management module 212 may not perform a separate processing on the data stored in the defective memory regions.

Upon receiving an instruction to use the data stored in the defective memory regions from the first host device 100_1, as described above, the memory management module 212 may migrate the data of the defective memory regions to new memory regions. The memory management module 212 may allocate the new memory regions to the first host device 100_1, and may transmit allocation information of the new memory regions to the first host device 100_1.

Since the warning signal is transmitted to the first host device 100_1, which is allocated with the defective memory regions, and according to a request of the first host device 100_1, operations of the defective memory regions are discontinued or the data stored in the defective memory regions is migrated, it is possible to prevent a failure from occurring during data processing by the first host device 100_1 using the defective memory regions.

When data processing according to a request of the first host device 100_1 which is allocated with the defective memory regions is completed, the memory management module 212 may separately manage the defective memory regions.

Figure 9:
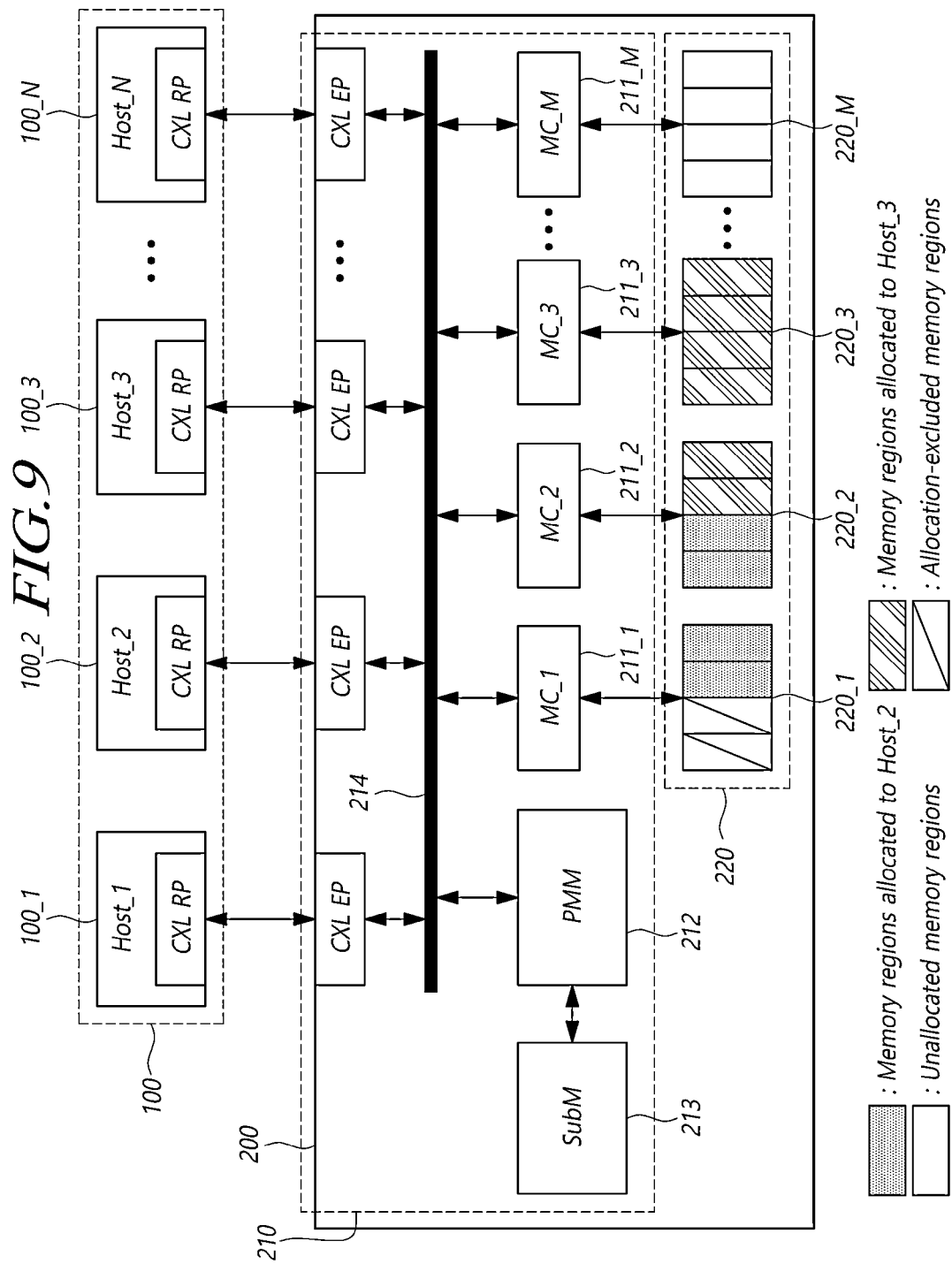
FIG. 9 is a diagram illustrating an example of a memory region management that is performed when the memory system based on the embodiment of the disclosed technology predicts an occurrence of an error in memory regions.

FIG. 9 is a diagram illustrating an example of a memory region management that is performed when the memory system 200 based on the embodiment of the disclosed technology predicts an occurrence of an error in memory regions.

Referring to FIG. 9, some memory regions of the first memory device 220_1 may be detected as defective memory regions by error occurrence prediction analysis of the memory management module 212.

In some implementations, according to a request of the first host device 100_1 which is allocated with the defective memory regions, processing on the data stored in the defective memory regions may be performed. Alternatively, without a request of the first host device 100_1, processing on the data stored in the defective memory regions may be performed by the memory management module 212.

When the processing on the data stored in the defective memory regions is completed, the memory management module 212 may store and manage information on the defective memory regions, for example, in the auxiliary memory 213

Upon receiving an allocation request from the first host device 100_1, the memory management module 212 may allocate a part of remaining memory regions except the defective memory regions to the first host device 100_1.

After memory regions allocated to the first host device 100_1 are detected as the defective memory regions, upon an allocation request by the second host device 100_2, the memory management module 212 may allocate a part of remaining memory regions except the defective memory regions to the second host device 100_2.

The memory management module 212 may exclude the memory regions detected as the defective memory regions from a pool of allocatable memory regions.

Upon receiving allocation requests by the plurality of host devices 100 after detection of the defective memory regions, the memory management module 212 may allocate parts of remaining memory regions except the defective memory regions to the host devices 100 which have transmitted the allocation requests.

Since a memory region allocated to any host device 100 and is detected as a defective memory region is not used by the other host devices 100, it is possible to prevent a failure from occurring during data processing by the other host devices 100 due to allocation of the defective memory region.

Similarly to when a defective memory region is detected by the memory management module 212 of the memory system 200, even when a defective memory region is detected by the host device 100, the defective memory region may be excluded from a pool of allocatable memory regions.

For example, when the first host device 100_1 reads data from a memory region allocated by the memory system 200, the first host device 100_1 may detect a defective memory region on the basis of the number of error corrections and so on. The first host device 100_1 may provide information on the defective memory region to the memory management module 212 of the memory system 200.

The memory management module 212 may store and manage the information on the defective memory region received from the first host device 100_1, for example, in the auxiliary memory 213.

When receiving an allocation request from the first host device 100_1 or a host device 100 other than the first host device 100_1, the memory management module 212 may allocate a memory region except the defective memory region to the host device which has transmitted the allocation request, on the basis of the information stored in the auxiliary memory 213.

Even when an error occurrence prediction analysis is performed by any host device 100 outside the memory system 200, it is possible to prevent a failure from occurring during data processing due to the defective memory region when remaining host devices 100 use the memory system 200.

In this way, when a defective memory region is detected, since the memory management module 212 excludes the defective memory region from a pool of allocatable memory regions, it is possible to improve data processing regardless of the presence of the defective memory region.

Figure 10:
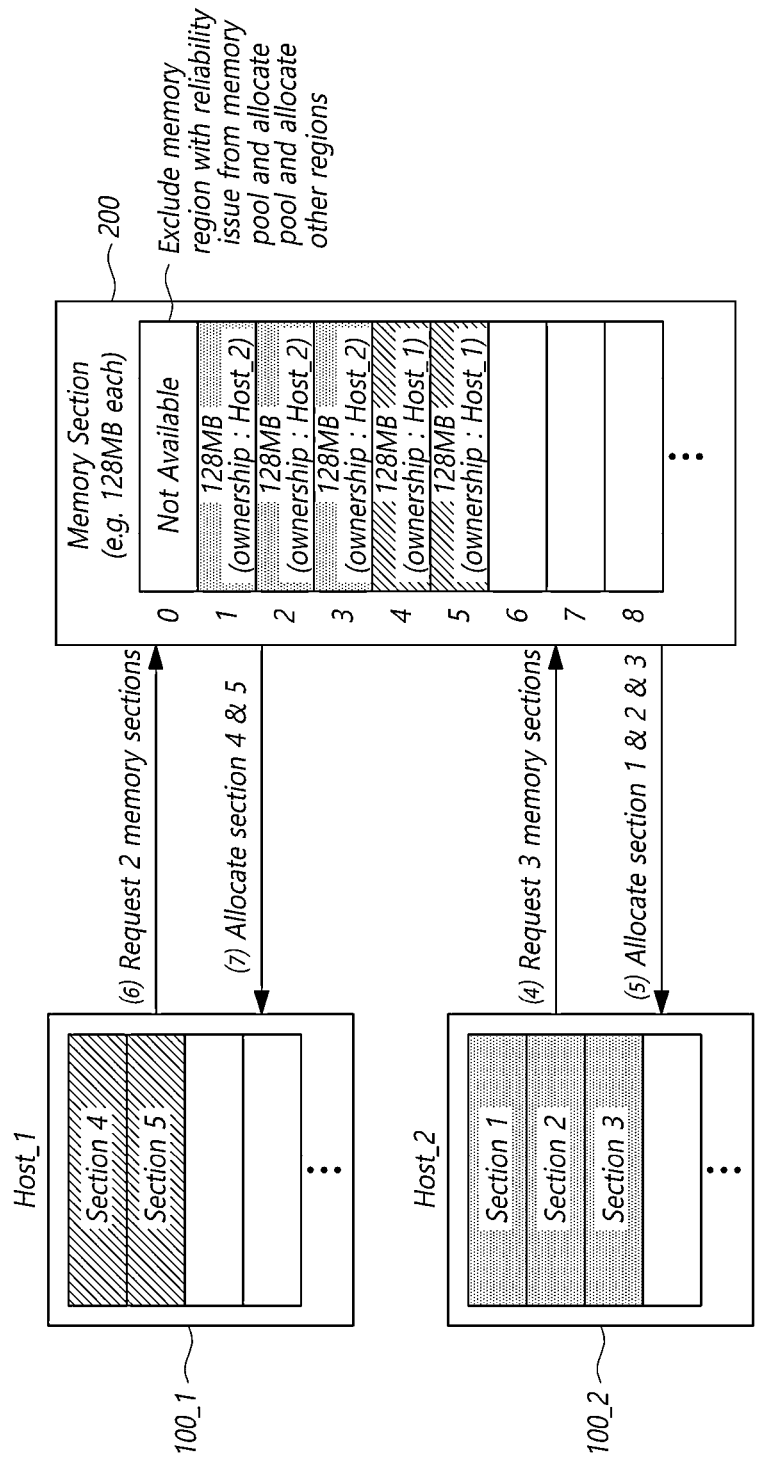
FIG. 10 is a diagram illustrating an example of an allocation and a deallocation of memory regions by the memory system based on the embodiment of the disclosed technology according to requests of the host device.

FIG. 10 is a diagram illustrating an example of an allocation and a deallocation of memory regions by the memory system 200 based on an embodiment of the disclosed technology according to requests of the host device 100.

Referring to FIG. 10, in some implementations, a memory region is allocated after a defective memory region is detected in a state in which memory regions are allocated to the first host device 100_1 and the second host device 100_2.

For example, the memory region 0 included in the memory system 200 may be allocated to the first host device 100_1 by the memory management module 212. The memory region 1, the memory region 2 and the memory region 3 may be allocated to the second host device 100_2 by the memory management module 212.

In some implementations, the memory management module 212 performs an error occurrence prediction analysis, and the memory region 0 allocated to the first host device 100_1 may be detected as a defective memory region. Alternatively, the first host device 100_1, which is allocated with the memory region 0, performs an error occurrence prediction analysis, and accordingly the memory region 0 may be detected as a defective memory region.

When the memory region 0 is detected as a defective memory region, the memory management module 212 may exclude the memory region 0 from a pool of allocatable memory regions.

Referring to FIG. 10, at operation (6), a request for allocation of two memory regions may be transmitted to the memory system 200 by the first host device 100_1.

For example, at operation (7), the memory management module 212 of the memory system 200 may allocate a memory region 4 and a memory region 5 to the first host device 100_1 by excluding the defective memory region and the memory regions allocated to the second host device 100_2.

Even when an allocation request by the second host device 100_2 or another host device 100 is received, the memory management module 212 may allocate a memory region other than the memory region 0 and the memory regions allocated to the second host device 100_2 to the corresponding host device 100.

As discussed above, the disclosed technology can be implemented in some embodiments to prevent data loss that would have resulted from a defective memory region through the error occurrence prediction analysis of the memory management module 212, and accordingly it is possible to prevent data loss that would have resulted from the use of the defective memory region by another host device 100 after the defective memory region is detected.

In some implementations discussed above, the plurality of host devices 100 uses the memory system 200 including the plurality of memory devices 220. In other implementations, one host device 100 uses the memory system 200 including one memory device 220. In other implementations, where two or more host devices 100 use the memory system 200 including one memory device 220. In other implementations, one host device 100 uses the memory system 200 including two or more memory devices 220.

In some implementations, detection, processing and management of a defective memory region may be performed by a component located outside the memory system 200.

Figure 11:
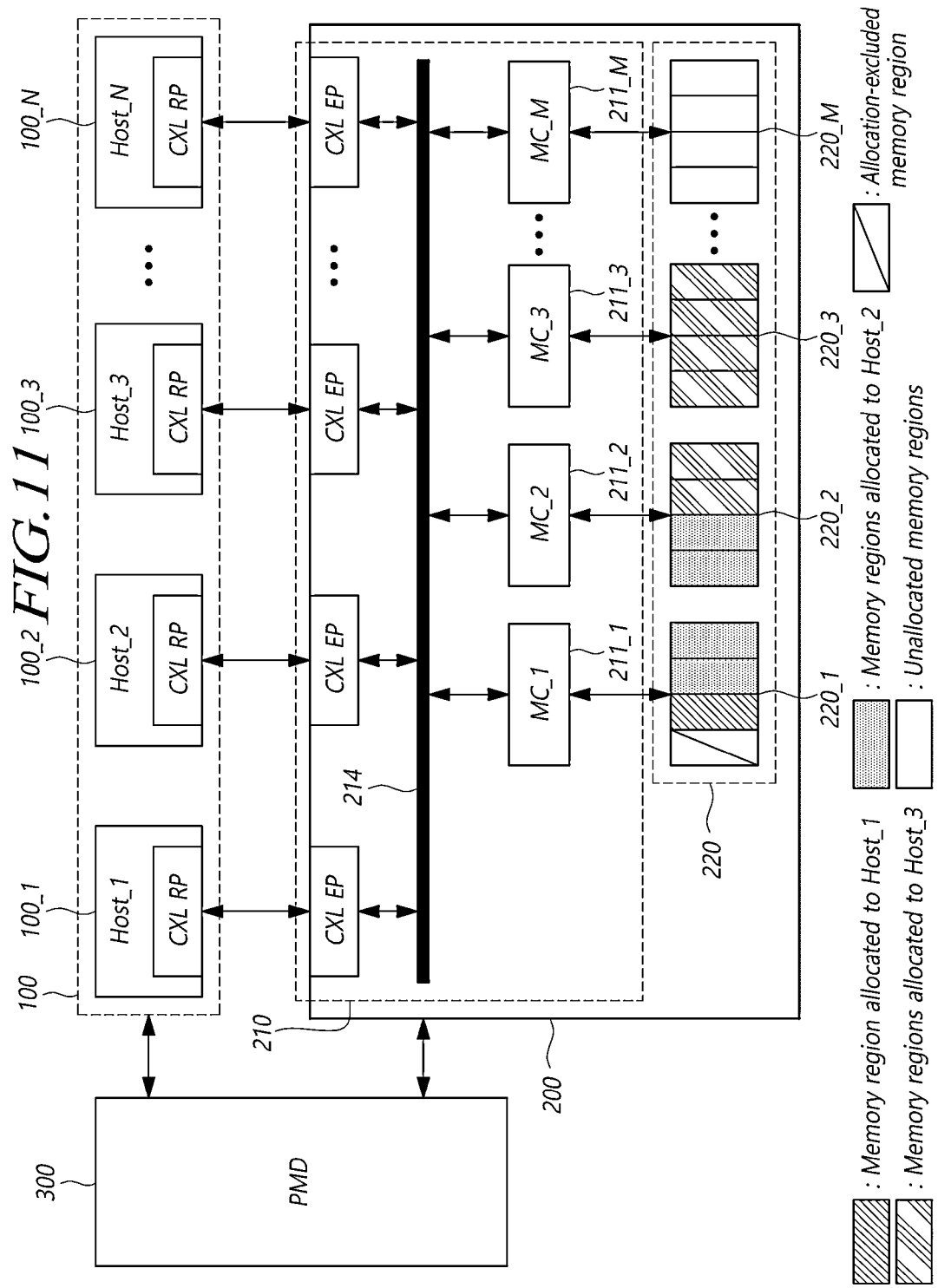
FIG. 11 is a diagram illustrating an example configuration of a memory system based on an embodiment of the disclosed technology.

FIG. 11 is a diagram illustrating an example configuration of a memory system 200 based on an embodiment of the disclosed technology.

Referring to FIG. 11, the memory system 200 based on the embodiment of the disclosed technology may include at least one memory device 220 that includes two or more memory regions. The memory system 200 may include at least one memory controller 211 configured to control the operation of the memory device 220. The memory system 200 including the memory device 220 or the memory system 200 including the memory device 220 and the memory controller 211 may be referred to as a storage device or a data storage device.

A memory management device 300 may be located outside the memory system 200. The memory management device 300 and the above-described memory system 200 (or the storage device or the data storage device) may be collectively referred to as a data storage system.

The memory management device 300 may perform at least a part of the function of the memory management module 212 described above.

For example, the memory management device 300 may allocate or deallocate memory regions of the memory device 220 included in the memory system 200 according to requests of a plurality of host devices 100.

The host device 100 may be allocated with a memory region by the memory management device 300. The host device 100 may transmit a command for writing or reading data to or from the allocated memory region, through the memory management device 300 or directly to the memory system 200. FIG. 11 shows an example where the host device 100 may directly communicate with the memory system 200, but the host device 100 may communicate with the memory system 200 only through the memory management device 300 located outside the memory system 200.

The memory management device 300 may detect a defective memory region on the basis of operation information received from the memory controller 211 of the memory system 200. Alternatively, the memory management device 300 may receive information on a defective memory region from the memory controller 211.

When detecting a defective memory region or receiving information on a defective memory region, the memory management device 300 may transmit a warning signal to the host device 100 which is allocated with the defective memory region.

In some implementations, according to a request of the host device 100 which has received the warning signal, the memory management device 300 may deallocate the defective memory region or migrate data stored in the defective memory region to a new memory region.

Upon receiving an allocation request for a memory region from the host device 100, the memory management device 300 may allocate a part of memory regions except the defective memory region in response to the allocation request. The memory management device 300 may exclude the defective memory region from allocatable memory regions.

In some implementations, the memory management device 300 may transmit the warning signal, and may then migrate the data stored in the defective memory region to a new memory region regardless of a request of the host device 100. The memory management device 300 may allocate the new memory region to the host device 100 which has received the warning signal. The memory management device 300 may transmit mapping information on the new memory region to the host device 100 which has received the warning signal.

In some implementations, a defective memory region may be detected by the host device 100. The host device 100 may detect a defective memory region according to whether an error is detected in the process of reading data of an allocated memory region.

The memory management device 300 may perform processing (e.g., data migration, deallocation, etc.) on the defective memory region based on information on the defective memory region received from the host device 100.

For example, the memory management device 300 may communicate with the memory system 200 through the same interface as the communication interface between the host device 100 and the memory system 200. Also, the memory management device 300 may communicate with the host device 100 through the same interface.

Although the example shown in FIG. 11 illustrates the memory management device 300 as being located outside the memory system 200 and the host device 100, the memory management device 300 may be included in the host device 100, or at least a part of the function of the memory management device 300 may be incorporated into the host device 100.

For example, the memory management device 300 may be included in the host device 100. The memory management device 300 may be implemented in the form of a module which is included in the host device 100, or may be implemented in a form communicating with the host device 100 as a separate device which is located adjacent to the host device 100.

When at least a part the function of the memory management device 300 is included in the host device 100, the memory management device 300 may perform direct communication with the memory system 200 or may perform communication with the memory system 200 through the host device 100.

Alternatively, the memory management device 300 may directly communicate with the memory system 200, and the host device 100 may be implemented in a form performing communication with the memory system 200 through the memory management device 300.

As such, the memory management module 212 or the memory management device 300 which manages a defective memory region of the memory system 200 or the data storage device may be implemented in various forms. Since a defective memory region is managed by the memory management module 212 or the memory management device 300, the operational performance of the memory system 200 or the data storage device which includes memory regions to be allocated to the plurality of host devices 100 may be improved.

The foregoing embodiments are briefly described below.

A memory system according to embodiments of the present disclosure may comprise a plurality of memory devices, each memory device including a plurality of memory regions configured to store data, at least one memory controller in communication with the plurality of memory devices and a plurality of host devices and configured to control an operation of each of the plurality of memory devices in response to requests for memory operations from the plurality of host devices, and a memory management module configured be in communication with the plurality of memory devices, the plurality of host devices, and the at least one memory controller, and configured to allocate, in response to an allocation request from one or more host devices of the plurality of host devices, one or more memory regions of the plurality of memory regions of one or more memory devices of the plurality of memory devices to the one or more host devices; and transmit, upon identifying a memory region allocated to a first host device of the one or more host devices as a defective memory region with the memory device where an error is predicted to occur, a warning signal to the first host device.

The memory management module may obtain, from the at least one memory controller, operation information for controlling each of the plurality of memory devices, and may identify the defective memory region based on the operation information.

During a read operation on the plurality of memory regions, the memory management module may identify a memory region as the defective memory region upon performing a number of error corrections by the at least one memory controller such that the number of error corrections is equal to or greater than a preset threshold value.

During a read operation on the plurality of memory regions, the memory management module may identify a memory region adjacent to a known defective memory region as the defective memory region upon performing a number of error corrections by the at least one memory controller such that the number of error corrections is equal to or greater than a preset reference value.

The memory management module may periodically receive the operation information from the at least one memory controller.

The memory management module may receive the operation information in response to an interrupt request generated by the at least one memory controller.

The memory management module may transmit an operation information request command to the at least one memory controller, and may receive the operation information.

The memory management module may identify the defective memory region by receiving, from the at least one memory controller, information on the defective memory region detected by the at least one memory controller.

The memory management module may deallocate the defective memory region according to a deallocation request of the first host device which has received the warning signal.

The memory management module may reallocate, according to a migration request of the first host device which has received the warning signal, a new memory region of the plurality of memory regions to the first host device, and may migrate data stored in the defective memory region to the new memory region.

The memory management module may migrate, according to a migration request of the first host device which has received the warning signal, data stored in the defective memory region to a local memory that is adjacent to the first host device.

The memory management module may be configured to cause migration of data stored in the defective memory region to a new memory region of the plurality of memory regions, to reallocate the new memory region to the first host device, and may transmit allocation information of the reallocated new memory region to the first host device.

The memory management module may reallocate, upon receiving a new allocation request of the first host device, a memory region of the plurality of memory regions that is different from the defective memory region, as a memory region corresponding to the first host device.

The memory management module may allocate, in response to an allocation request of a second host device of the plurality of host devices that is different from the first host device, a memory region of the plurality of memory regions that is different from the defective memory region, as a memory region corresponding to the second host device.

The memory management module may identify the first host device of the plurality of host devices as being allocated with the defective memory region, based on occupation information from an auxiliary memory configured to store the occupation information regarding the plurality of memory regions allocated to the plurality of host devices.

The memory management module may store information on the defective memory region in the auxiliary memory.

The memory management module may further transmit the warning signal to host devices other than the first host device.

The memory management module may transmit, to the first host device, the warning signal including at least one of an error level and an error type of an error in the defective memory region.

A memory system according to embodiments of the present disclosure may comprise a plurality of memory devices, each memory device including a plurality of memory regions configured to store data, at least one memory controller in communication with the plurality of memory devices and a plurality of host devices, and configured to control an operation of each of the plurality of memory devices in response to requests from the plurality of host devices, and a memory management module configured to: allocate one or more memory regions of the plurality of memory regions in response to an allocation request from one or more host devices of the plurality of host devices; identify a defective memory region based on error occurrence prediction information received from at least one of the plurality of host devices; and allocate, upon receiving allocation requests from one or more host devices of the plurality of host devices, memory regions other than the defective memory region to the one or more host devices having transmitted the allocation requests.

The memory management module may identify the defective memory region by receiving the error occurrence prediction information from a first host device of the plurality of host devices, and may allocate, upon receiving an allocation request from a second host device of the plurality of host devices, a memory region other than the defective memory region to the second host device.

The memory management module may reallocate, according to a migration request of the first host device, a new memory region of the plurality of memory regions to the first host device, and may migrate data stored in the defective memory region to the new memory region.

The memory management module may migrate, according to a migration request of the first host device, data stored in the defective memory region to a local memory that is adjacent to the first host device.

The memory management module may migrate data stored in the defective memory region to a new memory region of the plurality of memory regions, may reallocate the new memory region to the first host device, and may transmit allocation information of the reallocated new memory region to the first host device.

At least one of the plurality of host devices may generate the error occurrence prediction information based on a number of error corrections performed by the at least one memory controller during a read operation on the memory regions.

A data storage system according to embodiments of the present disclosure may comprise a plurality of storage devices including a plurality of memory devices each memory device including a plurality of memory regions configured to store data, and a memory management device located outside the plurality of storage devices, and configured to: allocate one or more memory regions of the plurality of memory regions in response to an allocation request from one or more host devices of a plurality of host devices; and transmit, upon identifying a defective memory region where an error is predicted to occur, a warning signal to a first host device of the plurality of host devices that is allocated with the defective memory region.

Each of the plurality of storage devices may further include a memory controller configured to control an operation of the memory devices, and wherein the memory management device receives, from the memory controller, information on the defective memory region detected by the memory controller.

The memory management device may obtain, from the plurality of storage devices, operation information for controlling the memory devices, and may identify the defective memory region based on the operation information.

The memory management device may directly control an operation of the memory devices included in each of the plurality of storage devices, and may identify the defective memory region based on operation information for controlling the memory devices.

The memory management device may transmit the warning signal to at least one host device of the plurality of host devices other than the first host device.

The memory management device may transmit, to the first host device, the warning signal including at least one of an error level and an error type of an error in the defective memory region.

The memory management device may communicate with the plurality of storage devices using a same communication interface as a communication interface between the plurality of host devices and the plurality of storage devices.

A data storage device according to embodiments of the present disclosure may comprise a plurality of memory devices each including a plurality of memory regions configured to store data, and a memory controller in communication with the plurality of memory devices and configured to: control an operation of each of the plurality of memory devices; and migrate data stored in a defective memory region where an error is predicted to occur, to a new memory region according to a command received from outside the memory controller.

The memory controller may identify the defective memory region based on operation information for controlling at least one of the plurality of memory devices, may transmit information on the defective memory region to a memory management device located outside the memory controller, and may receive the command from the memory management device.

The memory controller may identify, as the defective memory region, a memory region upon performing a number of error corrections in a read operation on the plurality of memory regions such that the number of error corrections is equal to or greater than a preset threshold value.

The memory controller may transmit operation information for controlling at least one of the plurality of memory devices, to a memory management device located outside the memory controller, and may receive, from the memory management device, information on the defective memory region and the command.

The memory controller may receive information on the defective memory region and the command from a first host device which is allocated with the defective memory region among a plurality of host devices to which the plurality of memory regions are allocated.

A control unit according to embodiments of the present disclosure may comprise at least one memory controller configured to control an operation of a plurality of memory devices, each memory device including a plurality of memory regions configured to store data, and a memory management module configured to: allocate, in response to an allocation request from one or more host devices of a plurality of host devices, one or more memory regions of the plurality of memory regions to the one or more host devices, and transmit, upon identifying a memory region allocated to a first host device of the one or more host devices as a defective memory region where an error is predicted to occur, a warning signal to a host device of the plurality of host devices that is allocated with the defective memory region.

The memory management module may receive, from the at least one memory controller, information on the defective memory region detected by the at least one memory controller.

The memory management module may obtain, from the at least one memory controller, operation information for controlling at least one of the plurality of memory devices, and may identify the defective memory region based on the operation information.

The memory management module may transmit the warning signal including at least one of an error level and an error type of an error in the defective memory region, to the host device allocated with the defective memory region.

Upon identifying the defective memory region and receiving the allocation request of each of the plurality of host devices, the memory management module may allocate at least part of the plurality of memory regions except the defective memory region.

The control unit may further comprise an auxiliary memory configured to store occupation information regarding one or more of the plurality of memory regions allocated to one or more of the plurality of host devices.

Information on the defective memory region may be stored in the auxiliary memory.

Only a few embodiments and examples are described. Enhancements and variations of the disclosed embodiments and other embodiments can be made based on what is described and illustrated in this patent document.

What is claimed is:

1. A memory system comprising:
    a plurality of memory devices, each memory device including a plurality of memory regions configured to store data;
    at least one memory controller in communication with the plurality of memory devices and a plurality of host devices and configured to control an operation of each of the plurality of memory devices in response to requests for memory operations from the plurality of host devices; and
    a memory management module configured be in communication with at least one of the plurality of memory devices, the plurality of host devices, or the at least one memory controller, and configured to allocate, in response to an allocation request from one or more host devices of the plurality of host devices, one or more memory regions of the plurality of memory regions of one or more memory devices of the plurality of memory devices to the one or more host devices; and transmit, upon identifying a memory region allocated to a first host device of the one or more host devices as a defective memory region with the memory device where an error is predicted to occur, a warning signal to the first host device, and
    wherein the memory management module receives a number of error corrections performed by the at least one memory controller, and identifies the defective memory region based on the number of error corrections.

2. The memory system according to claim 1, wherein the memory management module obtains, from the at least one memory controller, operation information for controlling each of the plurality of memory devices, and identifies the defective memory region based on the operation information.

3. The memory system according to claim 2, wherein, during a read operation on the plurality of memory regions, the memory management module identifies a memory region as the defective memory region upon performing a number of error corrections by the at least one memory controller such that the number of error corrections is equal to or greater than a preset threshold value.

4. The memory system according to claim 2, wherein, during a read operation on the plurality of memory regions, the memory management module identifies a memory region adjacent to a known defective memory region as the defective memory region upon performing a number of error corrections by the at least one memory controller such that the number of error corrections is equal to or greater than a preset reference value.

5. The memory system according to claim 2, wherein the memory management module periodically receives the operation information from the at least one memory controller.

6. The memory system according to claim 2, wherein the memory management module receives the operation information in response to an interrupt request generated by the at least one memory controller.

7. The memory system according to claim 2, wherein the memory management module transmits an operation information request command to the at least one memory controller, and receives the operation information.

8. The memory system according to claim 1, wherein the memory management module identifies the defective memory region by receiving, from the at least one memory controller, information on the defective memory region detected by the at least one memory controller.

9. The memory system according to claim 1, wherein the memory management module deallocates the defective memory region according to a deallocation request of the first host device which has received the warning signal.

10. The memory system according to claim 1, wherein the memory management module reallocates, according to a migration request of the first host device which has received the warning signal, a new memory region of the plurality of memory regions to the first host device, and migrates data stored in the defective memory region to the new memory region.

11. The memory system according to claim 1, wherein the memory management module migrates, according to a migration request of the first host device which has received the warning signal, data stored in the defective memory region to a local memory that is adjacent to the first host device.

12. The memory system according to claim 1, wherein the memory management module is configured to cause migration of data stored in the defective memory region to a new memory region of the plurality of memory regions, to reallocate the new memory region to the first host device, and transmits allocation information of the reallocated new memory region to the first host device.

13. The memory system according to claim 1, wherein the memory management module reallocates, upon receiving a new allocation request of the first host device, a memory region of the plurality of memory regions that is different from the defective memory region, as a memory region corresponding to the first host device.

14. The memory system according to claim 1, wherein the memory management module allocates, in response to an allocation request of a second host device of the plurality of host devices that is different from the first host device, a memory region of the plurality of memory regions that is different from the defective memory region, as a memory region corresponding to the second host device.

15. The memory system according to claim 1, wherein the memory management module identifies the first host device of the plurality of host devices as being allocated with the defective memory region, based on occupation information from an auxiliary memory configured to store the occupation information regarding the plurality of memory regions allocated to the plurality of host devices.

16. The memory system according to claim 1, wherein the memory management module stores information on the defective memory region in an auxiliary memory.

17. The memory system according to claim 1, wherein the memory management module further transmits the warning signal to host devices other than the first host device.

18. The memory system according to claim 1, wherein the memory management module transmits, to the first host device, the warning signal including at least one of an error level and an error type of an error in the defective memory region.

19. A data storage system comprising:
a plurality of storage devices including a plurality of memory devices each memory device including a plurality of memory regions configured to store data; and
a memory management device located outside the plurality of storage devices, and configured to: allocate one or more memory regions of the plurality of memory regions in response to an allocation request from one or more host devices of a plurality of host devices; and transmit, upon identifying a defective memory region where an error is predicted to occur, a warning signal to a first host device of the plurality of host devices that is allocated with the defective memory region, and
wherein the memory management device receives a number of error corrections performed by the plurality of storage devices, and identifies the defective memory region based on the number of error corrections.

20. A control unit comprising:
at least one memory controller configured to control an operation of a plurality of memory devices, each memory device including a plurality of memory regions configured to store data; and
a memory management module configured to: allocate, in response to an allocation request from one or more host devices of a plurality of host devices, one or more memory regions of the plurality of memory regions to the one or more host devices; and transmit, upon identifying a memory region allocated to a first host device of the one or more host devices as a defective memory region where an error is predicted to occur, a warning signal to a host device of the plurality of host devices that is allocated with the defective memory region, and
wherein the memory management module receives a number of error corrections performed by the at least one memory controller, and identifies the defective memory region based on the number of error corrections.

* * * * *